(12) United States Patent
Spall et al.

(10) Patent No.: US 10,396,443 B2
(45) Date of Patent: Aug. 27, 2019

(54) INTEGRATED ANTENNA IN AN AERIAL VEHICLE

(71) Applicant: GoPro, Inc., San Mateo, CA (US)

(72) Inventors: John Michael Spall, San Ramon, CA (US); Adrian Matthew Cooke, San Mateo, CA (US)

(73) Assignee: GoPro, Inc., San Mateo, CA (US)

( * ) Notice: Subject to any disclaimer, the term of this patent is extended or adjusted under 35 U.S.C. 154(b) by 253 days.

(21) Appl. No.: 15/268,455

(22) Filed: Sep. 16, 2016

(65) Prior Publication Data

US 2017/0179582 A1 Jun. 22, 2017

Related U.S. Application Data

(60) Provisional application No. 62/269,880, filed on Dec. 18, 2015.

(51) Int. Cl.
*H01Q 1/28* (2006.01)
*H01Q 7/00* (2006.01)
*B64C 39/02* (2006.01)
*H01Q 21/30* (2006.01)

(52) U.S. Cl.
CPC ............. *H01Q 1/28* (2013.01); *B64C 39/024* (2013.01); *H01Q 1/286* (2013.01); *H01Q 7/00* (2013.01); *H01Q 21/30* (2013.01)

(58) Field of Classification Search
CPC . H01Q 7/00; H01Q 1/28; H01Q 1/286; B64C 39/024
See application file for complete search history.

(56) References Cited

U.S. PATENT DOCUMENTS

| | | | | |
|---|---|---|---|---|
| 4,012,742 A * | 3/1977 | Dempsey | ................. | H01Q 7/00 342/373 |
| 4,804,965 A * | 2/1989 | Roederer | ................. | H01Q 9/26 343/700 MS |
| 4,924,237 A * | 5/1990 | Honda | .................... | H01Q 1/243 343/702 |
| 5,654,724 A * | 8/1997 | Chu | ......................... | H01Q 9/38 343/742 |
| 5,784,032 A * | 7/1998 | Johnston | ................ | H01Q 1/243 343/702 |

(Continued)

*Primary Examiner* — Dameon E Levi
*Assistant Examiner* — Ab Salam Alkassim, Jr.
(74) *Attorney, Agent, or Firm* — Young Basile Hanlon & MacFarlane, P.C.

(57) ABSTRACT

Disclosed is a cross loop antenna system for an aerial vehicle. In one embodiment, the cross loop antenna system includes a cross bar antenna and a ground plane. The cross bar antenna includes two thin coplanar perpendicular bars that intersect in the middle and are parallel to the ground plane. Each bar couples to the ground plane at each end, comprising an antenna loop. Thus, the cross loop antenna system comprises two intersecting single-fed loops. The antenna can operate at a wavelength that is approximately twice the length of the bars. In such an embodiment, the antenna system may be resonant. The distance between the bars and the ground plane may be relatively small, thus minimalizing the vertical profile of the antenna. The antenna may be operated as a dual-band antenna and may produce an omnidirectional radiation pattern. An aerial vehicle may include two such antennas.

17 Claims, 10 Drawing Sheets

(56) References Cited

U.S. PATENT DOCUMENTS

| | | | | |
|---|---|---|---|---|
| 6,480,158 B2* | 11/2002 | Apostolos | H01Q 1/242 | 343/700 MS |
| 6,542,128 B1* | 4/2003 | Johnson | H01Q 1/242 | 343/742 |
| 6,861,986 B2* | 3/2005 | Fang | G06F 1/1616 | 343/700 MS |
| 6,888,510 B2* | 5/2005 | Jo | H01Q 21/26 | 343/700 MS |
| 8,193,989 B2* | 6/2012 | Fujita | H01Q 1/007 | 343/700 MS |
| 8,836,603 B2* | 9/2014 | Hanazawa | H01Q 3/24 | 343/742 |
| 8,908,573 B1* | 12/2014 | Wang | H04L 5/26 | 370/280 |
| 9,061,763 B1* | 6/2015 | Christensen | A63H 17/28 | |
| 9,431,712 B2* | 8/2016 | Abadi | H01Q 9/0421 | |
| 9,577,347 B2* | 2/2017 | Chakam | H01Q 9/26 | |
| 9,960,484 B2* | 5/2018 | Chieh | H01Q 1/36 | |
| 10,141,647 B2* | 11/2018 | Rockway | H01Q 13/00 | |
| 2002/0044102 A1* | 4/2002 | Yokoshima | H01Q 1/243 | 343/895 |
| 2002/0118138 A1* | 8/2002 | Lindenmeier | H01Q 7/00 | 343/742 |
| 2002/0140607 A1* | 10/2002 | Zhou | H01Q 1/243 | 343/700 MS |
| 2004/0174316 A1* | 9/2004 | Keren | H01Q 1/36 | 343/867 |
| 2004/0263396 A1* | 12/2004 | Sung | H01Q 1/243 | 343/702 |
| 2007/0188388 A1* | 8/2007 | Feng | H01Q 1/243 | 343/700 MS |
| 2009/0002243 A1* | 1/2009 | Dahlstrom | H01Q 1/243 | 343/702 |
| 2009/0027294 A1* | 1/2009 | Bourry | H01Q 9/0421 | 343/848 |
| 2010/0207811 A1* | 8/2010 | Lackey | G01S 19/21 | 342/357.44 |
| 2010/0289705 A1* | 11/2010 | Shtrom | H01Q 9/0442 | 343/702 |
| 2011/0128200 A1* | 6/2011 | Hossain | H01Q 7/00 | 343/745 |
| 2012/0056795 A1* | 3/2012 | Nagumo | H01P 5/02 | 343/787 |
| 2012/0154222 A1* | 6/2012 | Oh | H01Q 1/243 | 343/702 |
| 2013/0169490 A1* | 7/2013 | Pascolini | H01Q 1/243 | 343/702 |
| 2014/0071014 A1* | 3/2014 | Tai | H01Q 1/243 | 343/848 |
| 2014/0176373 A1* | 6/2014 | Crouch | H01Q 5/35 | 343/703 |
| 2014/0375522 A1* | 12/2014 | Lin | H01Q 1/243 | 343/853 |
| 2015/0162660 A1* | 6/2015 | Orsi | H01Q 7/00 | 343/848 |
| 2015/0249485 A1* | 9/2015 | Ouyang | H04B 5/0081 | 455/41.1 |
| 2015/0263436 A1* | 9/2015 | Chakam | H01Q 9/26 | 343/797 |
| 2016/0376031 A1* | 12/2016 | Michalski | B64C 39/024 | 701/15 |
| 2017/0185954 A1* | 6/2017 | McAllister | G06Q 10/087 | |
| 2018/0024555 A1* | 1/2018 | Parks | B32B 3/12 | 701/3 |
| 2018/0025651 A1* | 1/2018 | Anderson | B64C 39/024 | 701/2 |
| 2018/0277939 A1* | 9/2018 | Peitzer | H01Q 1/28 | |
| 2018/0342787 A1* | 11/2018 | McAllister | H01Q 11/08 | |
| 2019/0054997 A1* | 2/2019 | Tian | H01Q 1/36 | |

* cited by examiner

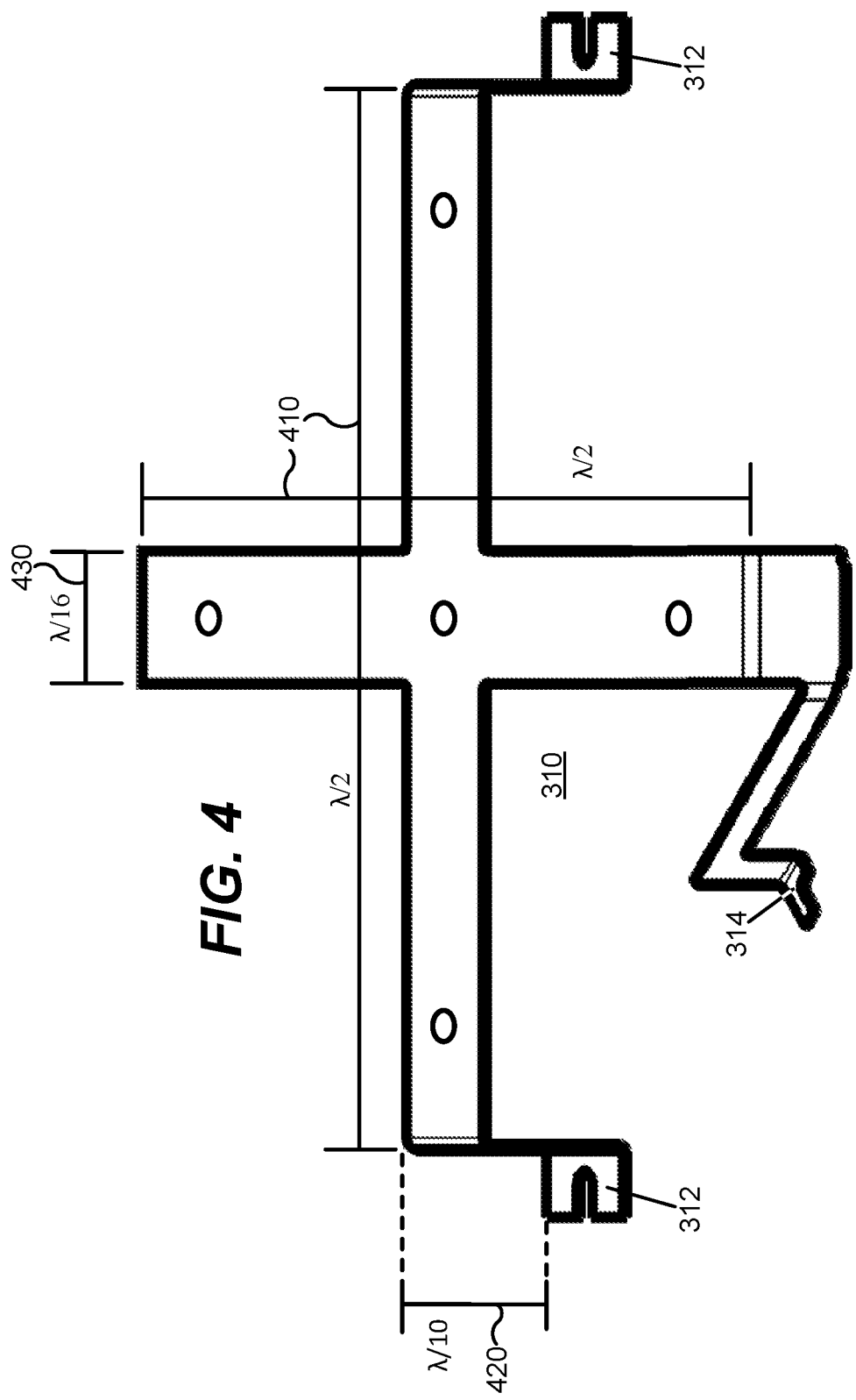

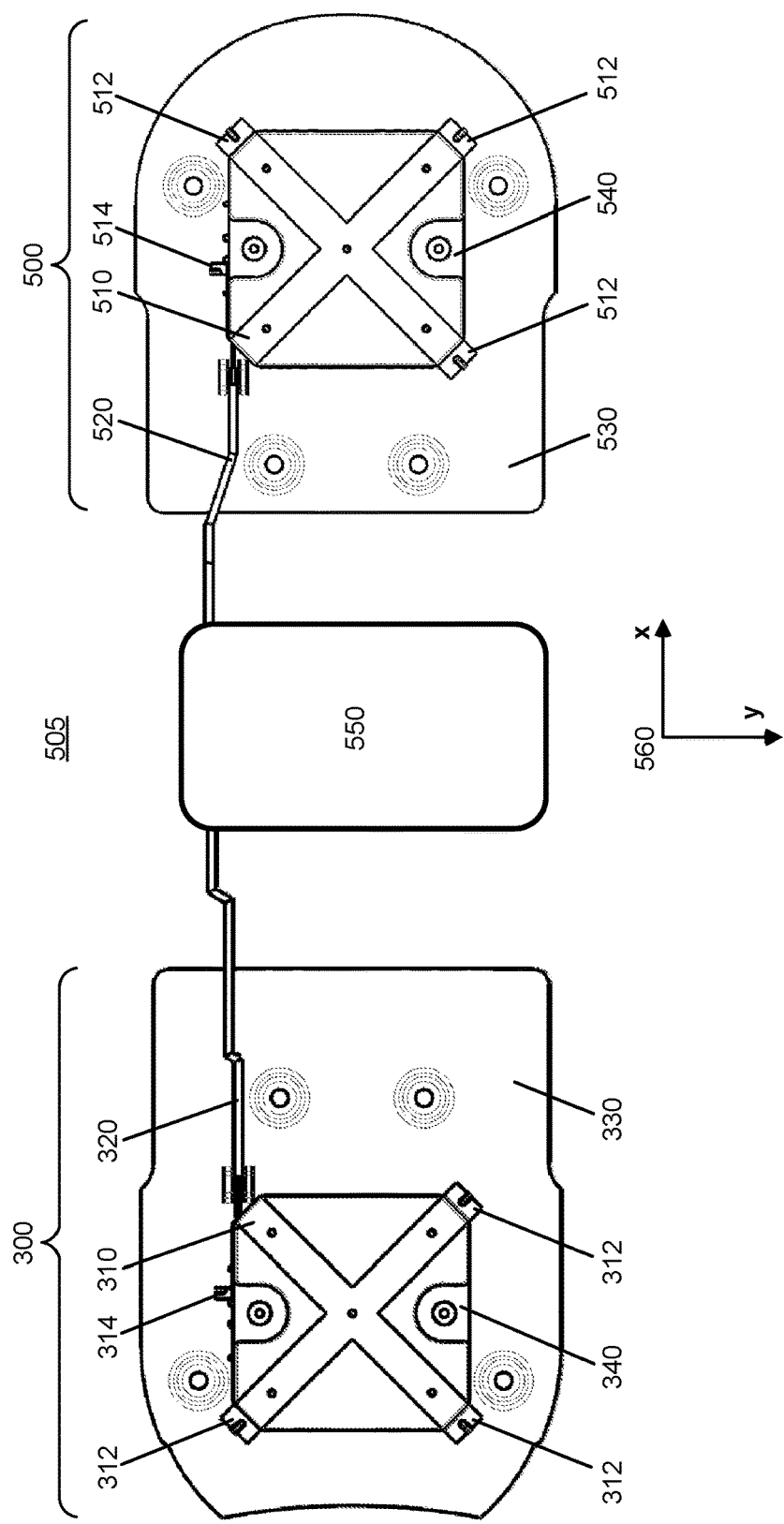

INTEGRATED ANTENNA IN AN AERIAL VEHICLE

RELATED APPLICATIONS

This application claims the benefit of U.S. Provisional Patent Application No. 62/269,880 filed on Dec. 18, 2015, the content of which is incorporated by reference in its entirety herein.

TECHNICAL FIELD

The disclosure generally relates to the field of antennas and in particular to an antenna for an aerial vehicle.

BACKGROUND

Remote controlled unmanned aerial vehicles, such as quadcopters, are known. Aerial vehicles continue to grow in popularity for both their commercial applications as well as recreational uses by hobbyists.

The ability of remote controlled aerial vehicles to quickly traverse space and to access places that a user cannot provides for many useful applications. However, a remote controlled aerial vehicle must, in general, maintain communicative contact with a remote controller, held by the user. A loss of connection between a remote controlled aerial vehicle and its remote controller can be catastrophic. Without user control, a remote controlled aerial vehicle may crash or may otherwise be lost. Thus, the utility of an aerial vehicle is constrained by the effective communication range of the receivers and transmitters in the remote controller and aerial vehicle. Therefore, an aerial vehicle must have antennas capable of reliably transmitting and receiving signals to and from its remote controller at a wide range of distances and at different relative orientations.

One conventional antenna for an aerial vehicle is an external antenna, such as a whip antenna. Whip antenna are relatively simple to implement and provide an omnidirectional radiation pattern, but are generally considered aesthetically displeasing. Furthermore, an external antenna can easily be damaged and may even collide with objects, such as tree branches, during flight, potentially leading to a crash. Thus, antennas which are internal to the aerial vehicle are advantageous. However, the internal antennas conventionally used by aerial vehicles often take up too much space within the aerial vehicle and/or do not have a suitably omnidirectional radiation pattern.

BRIEF DESCRIPTION OF THE DRAWINGS

The disclosed embodiments have advantages and features which will be more readily apparent from the detailed description, the appended claims, and the accompanying figures (or drawings). A brief introduction of the figures (FIGS.) is below.

FIG. 4 illustrates a cross bar antenna.

FIG. 5 illustrates rear and front cross loop antenna systems coupled to a wireless communication circuit, according to an embodiment.

DETAILED DESCRIPTION

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

Disclosed, by way of example embodiments, is a cross loop antenna system for an unmanned aerial vehicle. The cross loop antenna system includes a cross bar antenna and a ground plane. The cross bar includes antenna portions (e.g., two thin coplanar intersecting bars) that intersect in the middle and are parallel to the ground plane. The antenna portions may be perpendicular or substantially perpendicular (i.e., within 10° of being perpendicular). Each antenna portion connects (or otherwise couples) to the ground plane at each end, resulting in an antenna loop. Thus, the cross loop antenna system comprises two intersecting single-fed loops. The antenna can operate at a wavelength that is approximately twice the length of the antenna portions of the cross bar antenna. In such an embodiment, the antenna system may be resonant. The distance between the antenna portions and the ground plane may be relatively small, thus minimalizing the vertical profile of the antenna. The antenna may be operated as a dual-band antenna and may produce an omnidirectional radiation pattern. An aerial vehicle may include two such antennas.

Example Aerial Vehicle Configuration

Figure 1:
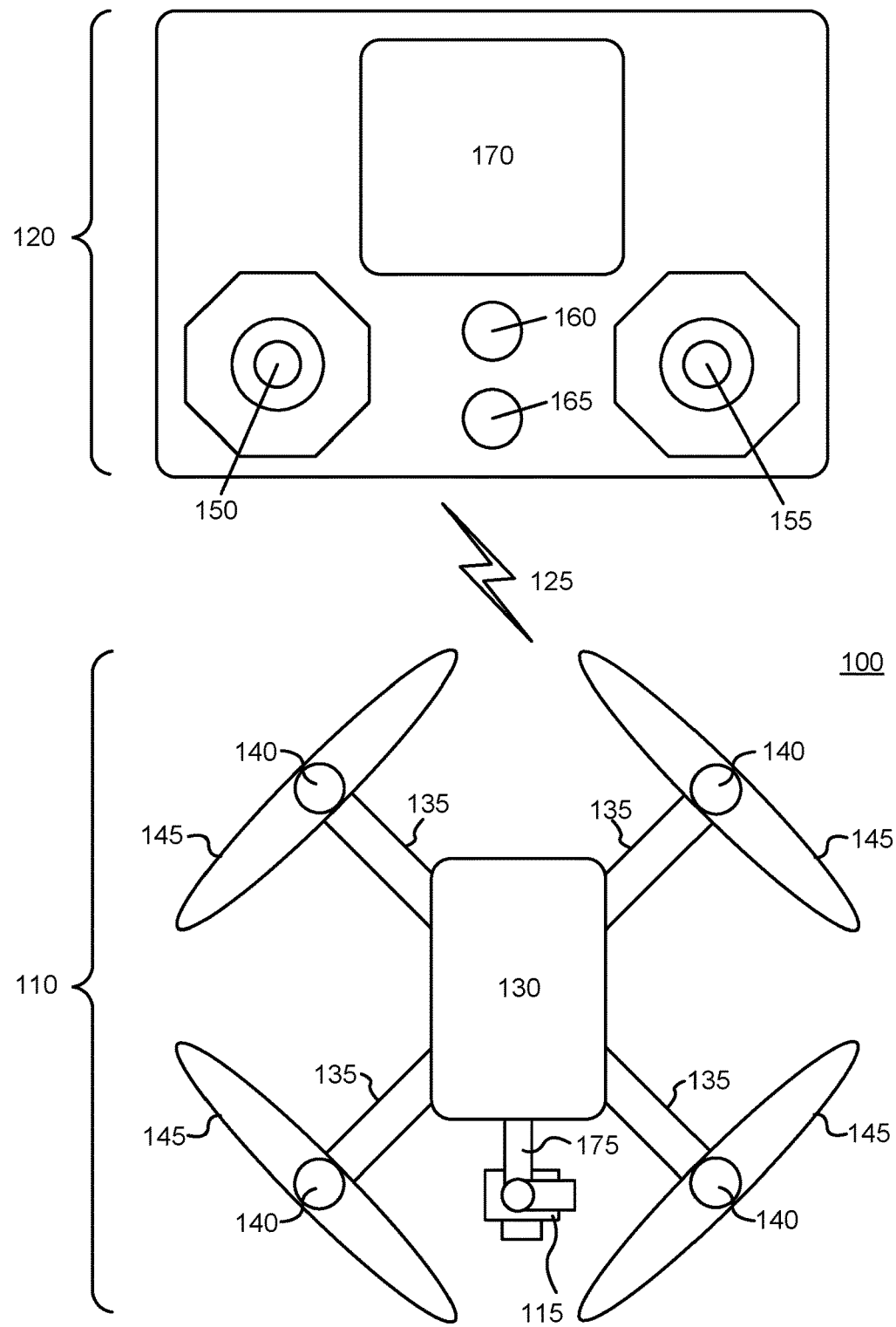
FIG. 1 is an example of a remote controlled aerial vehicle in communication with a remote controller.

FIG. 1 illustrates an example embodiment in which the aerial vehicle 110 is a quadcopter (e.g., a helicopter with four rotors). The aerial vehicle 110 in this example includes a housing 130 for a payload (e.g., electronics, storage media, and/or camera), four arms 135, four rotors 140, and four propellers 145. Each arm 135 mechanically may couple with a rotor 140 to create a rotary assembly. When the rotary assembly is operational, all the propellers 145 spin at appropriate speeds to allow the aerial vehicle 110 to lift (take off), land, hover, move, and rotate in flight. Modulation of the power supplied to each of the rotors 140 can control the acceleration and torque on the aerial vehicle 110.

A gimbal 175 may be coupled to the housing 130 of the aerial vehicle 110 through a removable coupling mechanism that mates with a reciprocal mechanism on the aerial vehicle 110 having mechanical and communicative capabilities. In some embodiments, the gimbal 175 can be attached or removed from the aerial vehicle 110 without the use of tools. A camera 115 may be mechanically coupled to the gimbal 175, so that the gimbal 175 steadies and controls the orientation of the camera 115. It is noted that in alternate embodiments, the camera 115 and the gimbal 175 can be an integrated configuration.

The aerial vehicle 110 may communicate with a remote controller 120 via a wireless network 125. In one embodiment, the wireless network 125 is a long range Wi-Fi system. It also can include or be another wireless communication system, for example, one based on long term evolution (LTE), 3G, 4G, or 5G mobile communication standards. In some embodiments, the wireless network 125 includes a single channel and the aerial vehicle 110 and the remote controller 120 implement a half-duplex system. In an alternate embodiment, the wireless network 125 includes two channels: a unidirectional RC channel used for communication of control information from the remote controller 120 to the aerial vehicle 110 and a separate unidirectional channel used for a video downlink from the aerial vehicle 110 to the remote controller 120 (or to a video receiver where direct video connection may be desired). Alternate wireless network configurations may also be used.

The remote controller 120 in this example includes a first control panel 150, a second control panel 155, an ignition button 160, a return button 165, and a screen 170. The first control panel 150 can be used to control "up-down" direction (e.g., lift and landing) of the aerial vehicle 110. The second control panel 155 can be used to control "forward-reverse" or can control the direction of the aerial vehicle 110. In alternate embodiments, the control panels 150, 155 are mapped to different directions for the aerial vehicle 110. Each control panel 150, 155 can be structurally configured as a joystick controller and/or touch pad controller. The ignition button 160 can be used to start the rotary assembly (e.g., start the rotors 140). The return button 165 can be used to override the controls of the remote controller 120 and transmit instructions to the aerial vehicle 110 to autonomously return to a predefined location. The ignition button 260 and the return button 265 can be mechanical and/or solid state press sensitive buttons.

In addition, each button may be illuminated with one or more light emitting diodes (LED) to provide additional details. For example the LED can switch from one visual state to another to indicate with respect to the ignition button 160 whether the aerial vehicle 110 is ready to fly (e.g., lit green) or not (e.g., lit red) or whether the aerial vehicle 110 is now in an override mode on return path (e.g., lit yellow) or not (e.g., lit red). It also is noted that the remote controller 120 can include other dedicated hardware buttons and switches and those buttons and switches may be solid state buttons and switches. For example, a button or switch can be configured to allow for triggering a signal to the aerial vehicle 110 to immediately execute a landing operation and/or a return to a designated location.

The remote controller 120 can also include hardware buttons or other user input devices that control the gimbal 175 or camera 115. The remote control 120 can allow it's user to change the preferred orientation of the camera 115. In some embodiments, the preferred orientation of the camera 115 can be set relative to the angle of the aerial vehicle 110. In another embodiment, the preferred orientation of the camera 115 can be set relative to the ground. The remote controller 120 may also transmit commands to the aerial vehicle 110 which are routed to the camera 115 through the gimbal 175 to take a picture, record a video, change a picture or video setting, and the like.

The remote controller 120 also includes a screen (or display) 170 which provides for visual display. The screen 170 can be a touch sensitive screen. The screen 170 also can be, for example, a liquid crystal display (LCD), an LED display, an organic LED (OLED) display, or a plasma screen. The screen 170 allow for display of information related to the remote controller 120, such as menus for configuring the remote controller 120 or remotely configuring the aerial vehicle 110. The screen 170 also can display images or video captured from the camera 115 coupled with the aerial vehicle 110, wherein the images and video are transmitted to the remote controller 120 via the wireless network 125. The video content displayed on the screen 170 can be a live feed of the video or a portion of the video captured by the camera 115. It is noted that the video content can be displayed on the screen 170 within a short time (e.g., up to fractions of a second) of being captured by the camera 115.

The video may be overlaid and/or augmented with other data from the aerial vehicle 110 such as the telemetric data from a telemetric subsystem of the aerial vehicle 110. The telemetric subsystem includes navigational components, such as a gyroscope, an accelerometer, a compass, a global positioning system (GPS) and/or a barometric sensor. In one example embodiment, the aerial vehicle 110 can incorporate the telemetric data with video that is transmitted back to the remote controller 120 in real time. The received telemetric data is extracted from the video data stream and incorporate into predefine templates for display with the video on the screen 170 of the remote controller 120. The telemetric data also may be transmitted separately from the video from the aerial vehicle 110 to the remote controller 120. Synchronization methods such as time and/or location information can be used to synchronize the telemetric data with the video at the remote controller 120. This example configuration allows a user of the remote controller 120 to see where the aerial vehicle 110 is flying along with corresponding telemetric data associated with the aerial vehicle 110 at that point in the flight. Further, if the user is not interested in telemetric data being displayed real-time, the data can still be received and later applied for playback with the templates applied to the video.

The remote controller 120 shown in FIG. 1 is a dedicated remote controller, but in alternate embodiments the remote controller 120 may be another computing device such as a laptop computer, smartphone, or tablet that is configured to wirelessly communicate with and control the aerial vehicle 110.

The remote controller 120 may contain one or more internal directional antennas. For example, the remote controller 120 may include two ceramic patch antennas. In some embodiments, the controller 120 uses both antennas for transmission and reception. In alternate embodiments, one antenna is used for reception and the other for transmission. The remote controller 120 may also include a Yagi-Uda antenna, a log-periodic antenna, a parabolic antenna, a short backfire antenna, a loop antenna, a helical antenna, a phased array of antennas, some combination thereof, or any other directional antenna.

Figure 2:
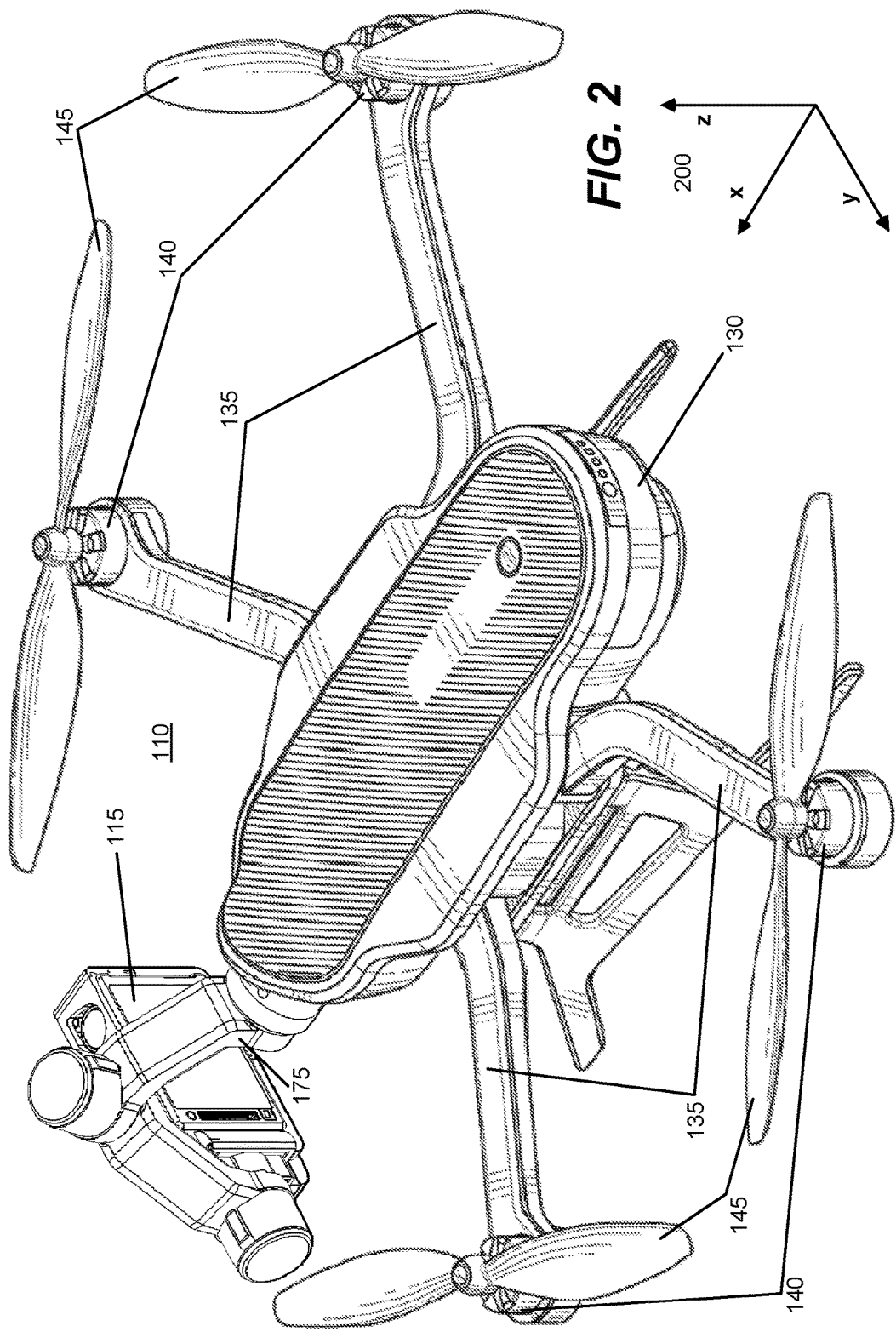
FIG. 2 illustrates an example of a remote controlled aerial vehicle.

FIG. 2 illustrates an example of an aerial vehicle 110. The aerial vehicle 110 may be coupled to a camera 115 via a gimbal 175. The camera 115 may capture video and send the video to the aerial vehicle 110 through a bus of the gimbal 175. The aerial vehicle 110 may wirelessly transmit the video to the remote controller 120. The aerial vehicle 110 may include one or more internal antennas in the housing 130 for wirelessly transmitting and receiving signals to and from the remote controller 120.

FIG. 2 also illustrates a 3-dimensional Cartesian coordinate system with x-y-z axes 200. The x-y-z axes 200 constitute an orthogonal right-handed coordinate system. The x-y plane is the horizontal plane and the z-axis is in the upward vertical direction. The x-axis points in the direction of the heading of the aerial vehicle 110. Herein, the components of the aerial vehicle 110 are described relative to this x-y-z coordinate system. In FIG. 2, the aerial vehicle 110 is depicted in its standard orientation. The standard orientation is the orientation in which the aerial vehicle 110 in still air can hover without moving or rotating. In some embodiments, the standard orientation of the aerial vehicle 110 is the orientation in which the axial direction of the rotors 140 is vertical.

Figure 3A:
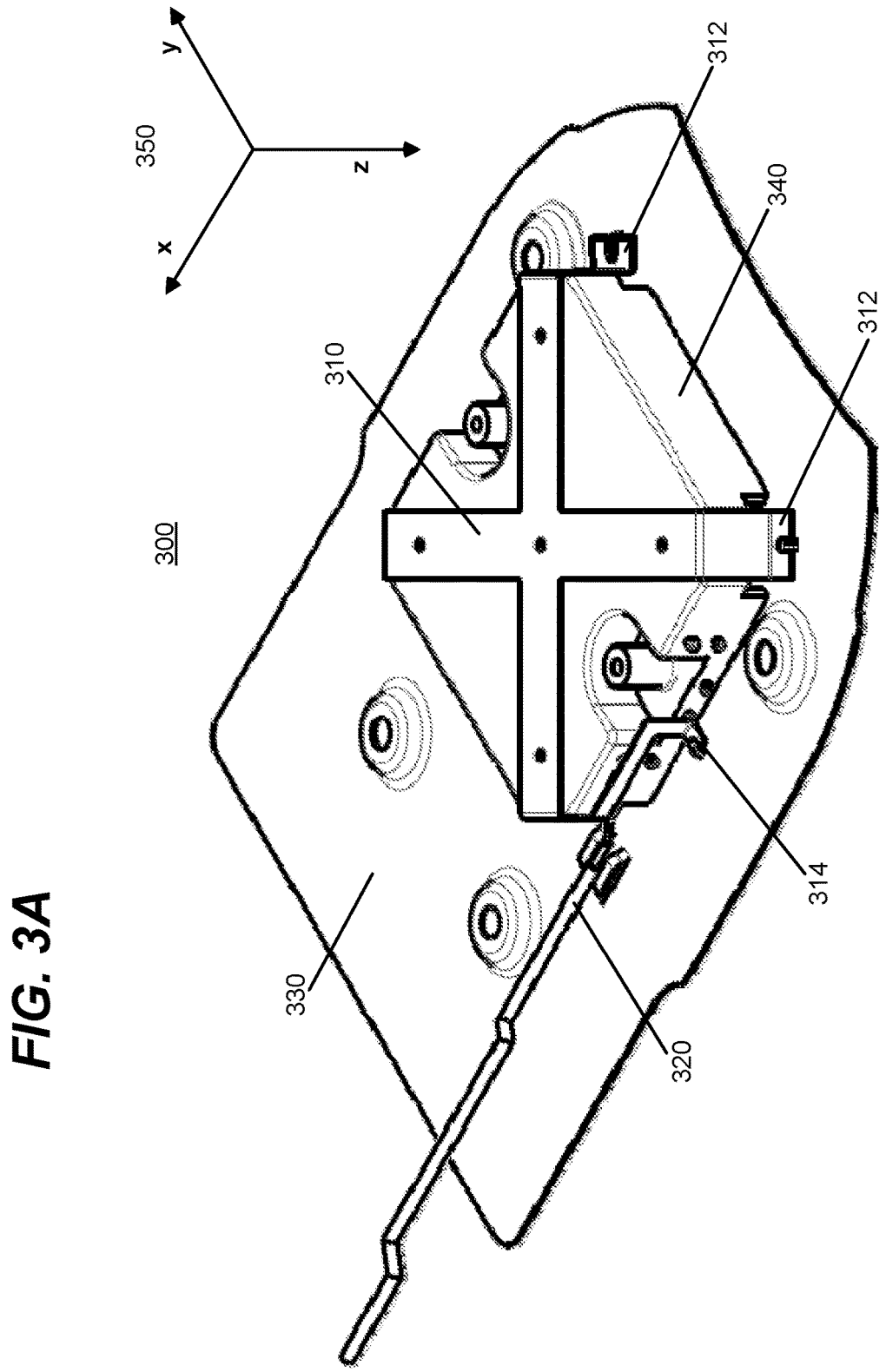
FIGS. 3A-3C illustrate an example rear cross loop antenna system for an aerial vehicle.
Figure 3B:
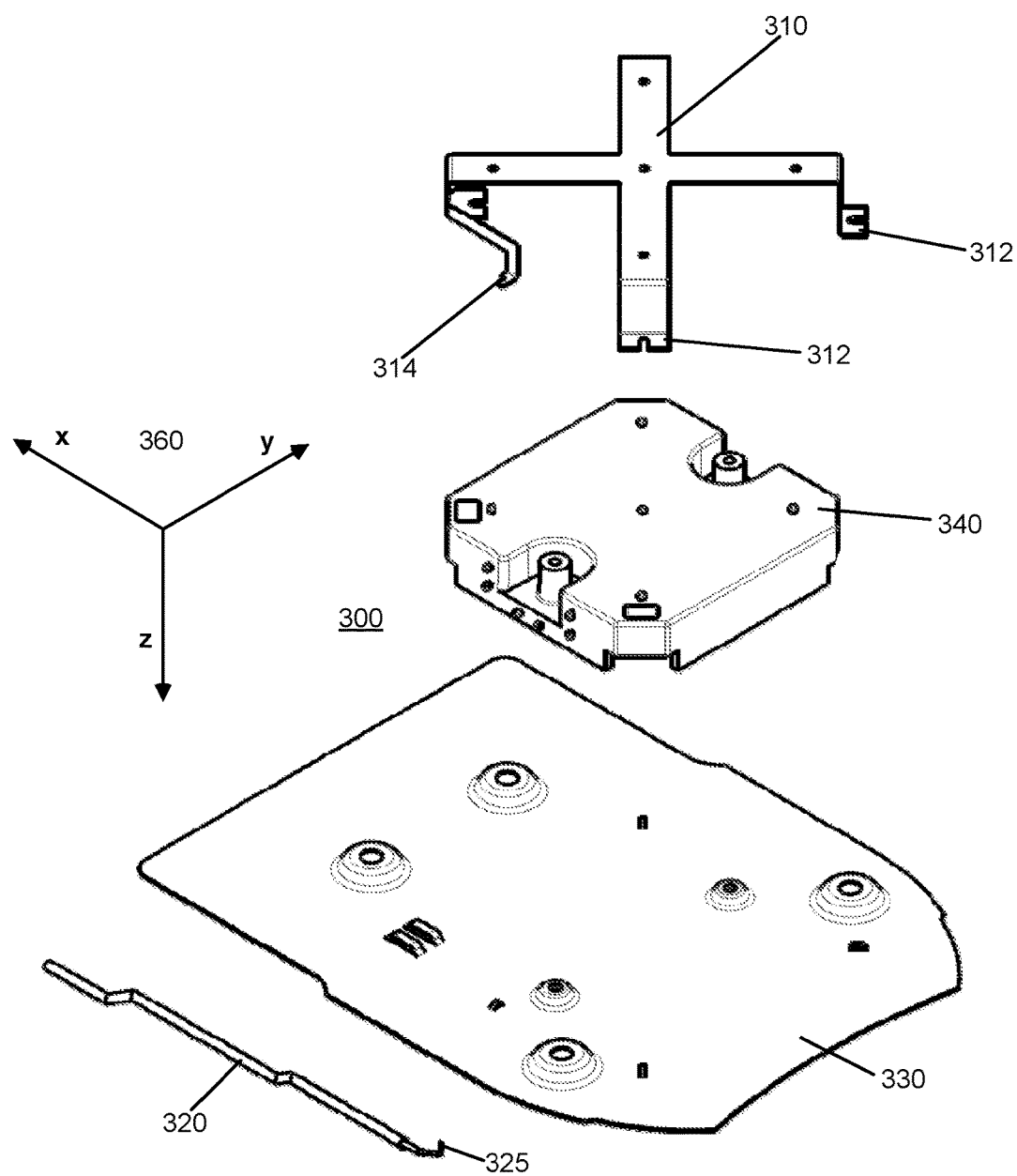
Figure 3C:
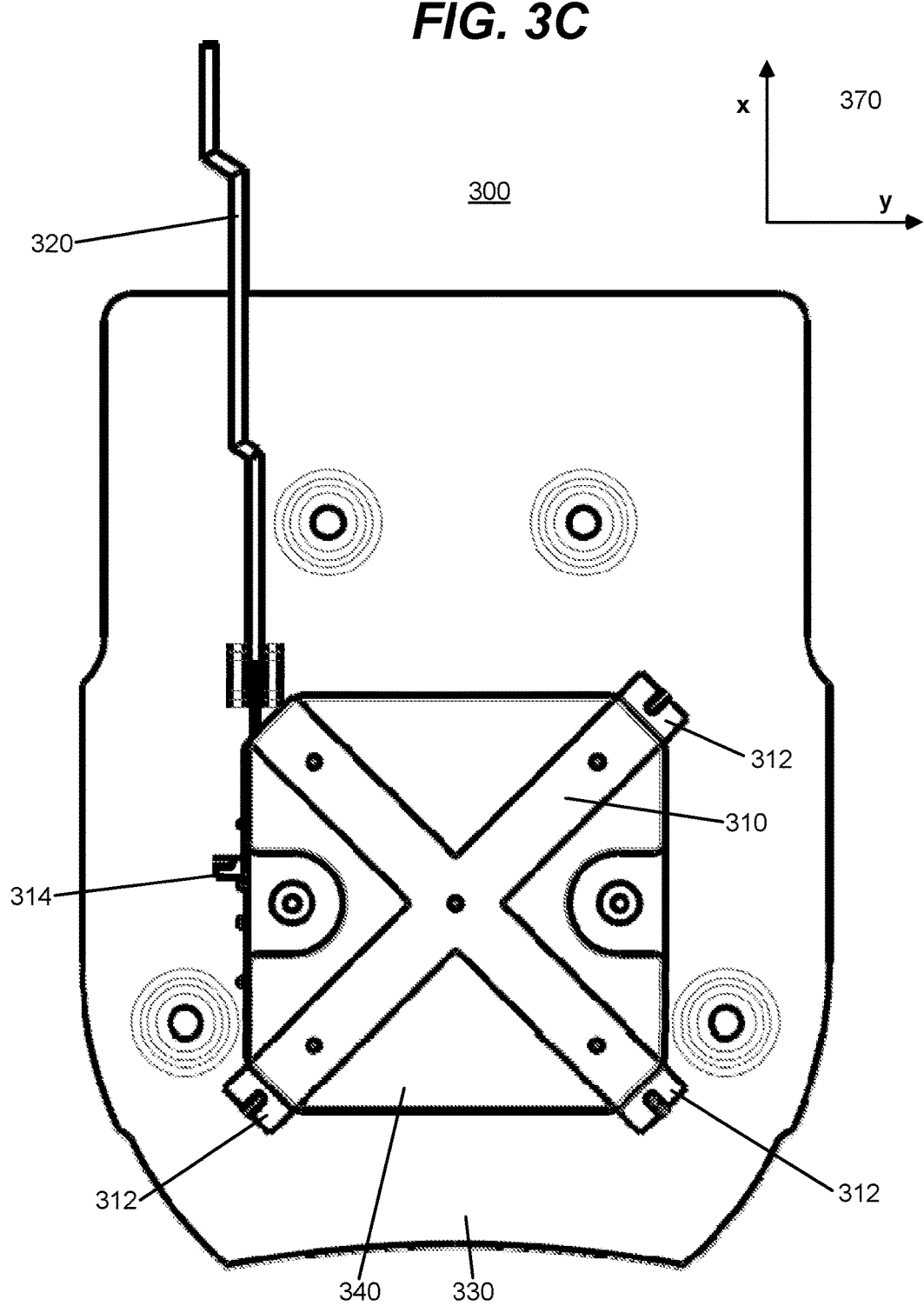

FIGS. 3A-3C illustrate an example cross loop antenna system for the aerial vehicle 110. The cross loop antenna system 300 depicted in FIGS. 3A-3C is located inside of the housing 130 of the aerial vehicle 110, for example, in the rear at the bottom. It is noted that the rear cross loop antenna system 300 is depicted from underneath in FIGS. 3A-3C. This rear cross loop antenna system 300 includes a cross bar antenna 310, a ground plane 330, and a support structure 340. The cross bar antenna 310 connects to the ground plane 330 at four electrical contacts: three ground contacts 312 and an impedance-matching ground contact 314. The support structure 340 connects to the cross bar antenna 310 and the ground plane 330. The rear cross loop antenna system 300 is connected to a feed line 320. The feed line 320 connects to both the cross bar antenna 310 and the ground plane 330. FIG. 3A is an isometric view of the rear cross loop antenna system 300, FIG. 3B is an exploded view of the rear cross loop antenna system 300, and FIG. 3C is a bottom plan view of the rear cross loop antenna system 300.

The cross bar antenna 310 is an electrical conductor (e.g., metal). The cross bar antenna 310 may include first and second antenna portions. In FIG. 3 the first and second antenna portions are thin coplanar bars which intersect at their respective centers. The antenna portions may be parallel to the horizontal (x-y) plane and to the ground plane 330. The antenna portions may be of substantially the same length (i.e., the smaller of the two antenna portions may be 85% as long as the longer of the two antenna portions or longer). The antenna portions may be perpendicular or substantially perpendicular (i.e., within 10° of being perpendicular). In some embodiments, the antenna portions are not perpendicular. For example, one antenna portion may be oriented 45° relative to the other.

Each end of the two antenna portions connects to the ground plane 330. Both ends of the first antenna portion connect to "legs" which extend upwards in the positive z-direction to connect to the ground plane 330. Each leg connects to the ground plane 330 at a ground contact 312. As depicted in FIG. 3A-3C, the ground contacts 312 may be "feet" that extend in the horizontal plane, to provide a relatively large area of electrical contact between the ground plane 330 and the cross bar antenna 310. The ground contacts 312 and the ground plane 330 may be soldered together. The second antenna portion of the cross bar antenna 310 connects to the ground plane 330 at one end by a leg connected to a ground contact 312. This leg and this ground contact 312 are the same as those of the first antenna portions. The other end of the second antenna portion connects to the impedance-matching ground contact 314. In some embodiments, the shape of the leg of the impedance-matching ground contact 314 is configured so that the impendence of the cross bar antenna 310 matches the impendence of the feed line 320. In alternate embodiments, the impendence-matching ground contact 314 has a different shape (e.g., curved, looping, or square). In some embodiments, the impendence-matching ground contact 314 is replaced with an on-board tuning circuit (e.g., capacitive and/or inductive elements).

Described differently, the cross bar antenna 310 includes four antenna segments. Each of the four antenna segments may respectively have a first and second end, wherein each of the first ends connects to the ground plane 330, and wherein the second ends mutually connect together. Three of the antenna segments may connect to the ground plane 330 at respective first ends with respective ground contacts 312. The other antenna segment may connect to the ground plane 330 at the first end with an impedance-matching ground contact 314.

The ground plane 330 is a thin plate of electrically conductive material, e.g., cut sheet metal. The ground plane 330 is parallel to the two antenna portions of the cross bar antenna 310. The edges of the ground plane 330 may adjoin the interior surface of the housing 130 of the aerial vehicle 110. In some embodiments, the ground plane 330 and the cross bar antenna 310 are the same piece of metal or are joined by welding. The rear cross loop antenna system 300 may include two loops. Each loop may include an antenna portion of the cross bar antenna 310, two ground contacts (either two ground contacts 312 or the impedance-matching ground contact 314 and the ground contact 312 opposite it), and the ground plane 330. The two loops are connected at the center of the two antenna portions of the cross bar antenna 310 and share the ground plane 330.

The feed line 320 is a transmission line, such as a coaxial cable. The feed line 320 carries a signal from the rear cross loop antenna system 300 when the rear cross loop antenna system 300 is transmitting a signal, and carries a signal from the rear cross loop antenna system 300 when the rear cross loop antenna system 300 is receiving a signal. One terminal of the feed line 320 (e.g., the outer tubular conducting shield of the coaxial cable) may connect to the ground plane 330. The other terminal of the feed line 320 (e.g., the inner conductor of the coaxial cable) may connect the cross bar antenna 310. This terminal of the feed line 320 may connect to the end of one of the antenna portions of the cross bar antenna 310 (i.e., the terminal may connect to one of the antenna segments of the cross bar antenna 310). The terminal of the feed line 320 may connect to the end of the antenna portion with the impedance-matching ground contact 314. In some embodiments, a matching circuit is coupled between the feed line 320 and the cross bar antenna 310 for impedance matching.

The support structure 340 may connect to the ground plane 330 and the cross bar antenna 310. The support structure 340 is between the ground plane 330 and the cross bar antenna 310. The support structure 340 prevents the shape of the cross bar antenna 310 from bending, twisting, or otherwise deforming thus maintaining the relative spacing between the cross bar antenna 310 and the ground plane 330. In some embodiments, the cross bar antenna 310 is affixed to the support structure 340 with fasteners (e.g., screws or bolts), adhesive, or an alternate means of ridged joining. The support structure 340 may be transparent or nearly transparent in the frequency band or bands in which the rear cross loop antenna system 300 operates. The support structure 340 may be an electrical insulator. In some embodiments, the support structure 340 is a plastic structure. In alternate embodiments, the support structure 340 is omitted. In such embodiments, the cross bar antenna 310 may be rigidly attached to a chassis, a monocoque, or a semi-monocoque of the aerial vehicle 110.

In some embodiments the support structure 340 includes dielectric material. For example, a layer of dielectric material may be adjacent to the ground plane 330. By dielectrically loading the rear cross loop antenna system 300, the size of the antenna can be reduced. The dielectric material may also be between the ground plane 330 and the cross bar antenna 310 but not part of the support structure 340.

FIG. 4 illustrates an example cross bar antenna 310 from an isomorphic view. FIG. 4 illustrates the length 410 of the antenna portions of the cross bar antenna 310, the width 430 of the bars, and the height 420 of the legs, in accordance with an embodiment. These lengths 410 and heights 420 are given in terms of a free space wavelength, denoted herein as $\lambda$. In some embodiments, the wavelength $\lambda$ is in the radio frequency (RF) range. The wavelength $\lambda$ may be the RF wavelength at which the rear cross loop antenna system 300 operates. The rear cross loop antenna system 300 may be resonant at the wavelength $\lambda$.

For a given wavelength $\lambda$ (e.g., $\lambda$=12.5 cm), if the length 410 of the antenna portions of the cross bar antenna 310 are about half a wavelength ($\lambda/2$), the rear cross loop antenna system 300 is resonant at this wavelength $\lambda$. The rear antenna system 300 may have a fundamental resonant wavelength of $\lambda$. The rear cross loop antenna system 300 may be resonant at more than one frequency and exhibits higher order modes. In some embodiments, the rear cross loop antenna system 300 transmits or receives at multiple resonant frequencies. For example, the rear cross loop antenna system 300 may be resonant at 2.4 GHz with higher order modes of 3.8 GHz and 5.8 GHz. The rear cross loop antenna system 300 may operate as a dual-band antenna with operating frequencies of 2.4 GHz and 5.8 GHz.

In the cross bar antenna 310 shown in FIG. 4, the height 420 of the legs is the displacement between the antenna portions of the cross bar antenna 310 and the ground plane 330. In FIG. 4, this displacement is 10% of the wavelength ($\lambda/10$). In general, a cross loop antenna system 300 with a larger displacement between the ground plane 330 and the antenna portions of the cross bar antenna 310 has a better bandwidth and radiation efficiency. However, a cross loop antenna system 300 with a larger displacement will also have a larger profile and thus require more space within the aerial vehicle 110. A cross bar antenna 310 with legs that are between 5% and 15% of the wavelength $\lambda$ provides a useful compromise between the goals of minimalizing the antenna profile and providing adequate performance. That is, in some embodiments, the distance between the antenna portions of the cross bar antenna 310 and the ground plane 330 is between 10% and 30% of the length 410 of the antenna portions. However, the displacement between the antenna portions and the ground plane 330 may be less than $\lambda/20$ if a smaller profile is required or greater than $3\times\lambda/20$ if a better radiation efficiency or bandwidth is required.

The width 430 of the antenna portions of the cross bar antenna 310 may be relatively small compared to the length 410 of the antenna portions. In FIG. 4, the width 430 of each antenna portion is one sixteenth of the wavelength ($\lambda/16$). In general, the width 430 of the antenna portion is between 3 and 12 mm. The antenna portions of the cross bar antenna 310 may have a uniform thickness. The legs of the cross bar antenna 310 may have this same thickness. As illustrated in FIG. 4, the thickness of each antenna portion of the cross bar antenna 310 may be significantly less than the width 430 of the antenna portion. The cross bar antenna 310 may be, for example, between 0.5 and 2 mm thick. In some embodiments, the cross bar antenna 310 is manufactured by cutting and bending sheet metal.

In some embodiments, the total length of each antenna loop of the cross loop antenna system 300 is about a single wavelength $\lambda$. The total length of an antenna loop may be the sum of the length 410 of an antenna portion of (e.g., $\lambda/2$), the height 420 of two legs (e.g., both $\lambda/10$), and the length of the distance between the two ground contacts 312 of the loop (e.g., $\lambda/2$). In FIG. 4, the length of an antenna loop is $\lambda/2+\lambda/10+\lambda/10+\lambda/2=1.2\lambda$. The length of a loop of the cross loop antenna system 300 may be, for example, between $1.1\times\lambda$ and $1.3\times\lambda$.

In some embodiments, the rear crossed loop antenna system 300 includes an alternate antenna instead of the cross bar antenna 310. Like the cross bar antenna 310, this alternate antenna may include two perpendicular or substantially perpendicular conductor elements joined at their respective centers which run parallel to the ground plane 330 and connect to the ground plane 330 at the end of each conductor element to form two perpendicular or substantially perpendicular loops. The conductor elements may be similar to the bars of the cross bar antenna 310, but have different cross sections. For example, the conductor elements may be wires instead of bars.

FIG. 5 illustrates an example antenna system. The antenna system 505 including a rear cross loop antenna system 300, a front cross loop antenna system 500, a wireless communication circuit 550, and two feed lines 320, 520. The front cross loop antenna system 500 and the rear cross loop antenna system 300 couple to the wireless communication circuit 550 via the feed line 520 and the feed line 320, respectively. Like the rear cross loop antenna system 300, the front cross loop antenna system 500 includes a cross bar antenna 510, a ground plane 530, and a support structure 540. The rear and front antenna systems 300, 500 are placed sufficiently far apart to provide for adequate antenna to antenna isolation (e.g., low mutual coupling). For example, the separation between the front cross loop antenna system 500 and the rear cross loop antenna system 300 may be 60 mm or greater.

In some embodiments, the aerial vehicle 110 includes a single cross loop antenna system which may be in the rear, the front, or the middle of the aerial vehicle 110.

The front cross loop antenna system 500 may be similar in structure and function to the rear cross loop antenna system 300. In FIG. 5, the cross bar antenna 510 and the support structure 540 of the front cross loop antenna system 500 are mirrored versions of the cross bar antenna 310 and the support structure 340 of the rear cross loop antenna system 300. The ground plane 530 of the front cross loop antenna system 500 may be a different shape than the ground plane of the rear cross loop antenna system 300. The two ground planes 330, 530 may be coplanar. In alternate embodiments, the cross bar antenna 510 of the front cross loop antenna system 500 has a different length than that of the cross bar antenna 310 of the rear cross loop antenna system 300. Accordingly, the resonant frequencies of the two cross loop antenna systems 300, 500 may be different. Additionally, the widths or the heights of the bars of the cross bar antennas 310, 510 or the heights of the bars of cross bar antennas 310, 510 from their respective ground planes 330, 530 may be different.

The wireless communication circuit 550 may be a transmitter, a receiver, or a transceiver. The wireless communication circuit 550 may transmit and/or receive data to communicate over the wireless network 125. Prior to transmitting data, the wireless communication circuit 550 may process the data by performing encryption, forward error correction (FEC) coding, lossless compression, lossy compression, packetizing the data, or some combination thereof. The wireless communication circuit 550 may multiplex data from multiple data streams of the aerial vehicle 110 or allocate data among a number of wireless channels. The wireless communication circuit 550 may also encode a data stream for path or spatial diversity. Similarly, the wireless communication circuit 550 may process data received over the wireless network 125 by performing decryption, error correction decoding, decompression, or some combination thereof. The wireless communication circuit 550 may also demultiplex data into multiple data streams.

Figure 6A:
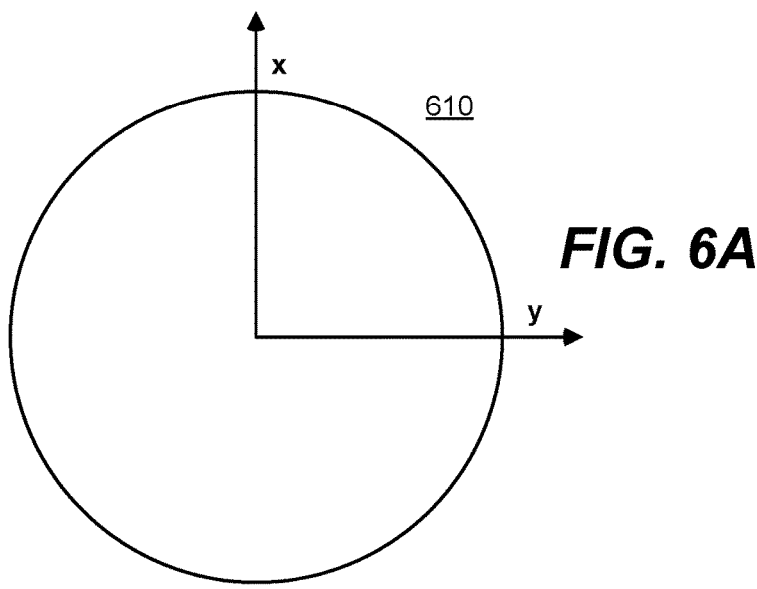
FIGS. 6A-6C illustrate a radiation pattern of a cross loop antenna, according to an embodiment.
Figure 6B:
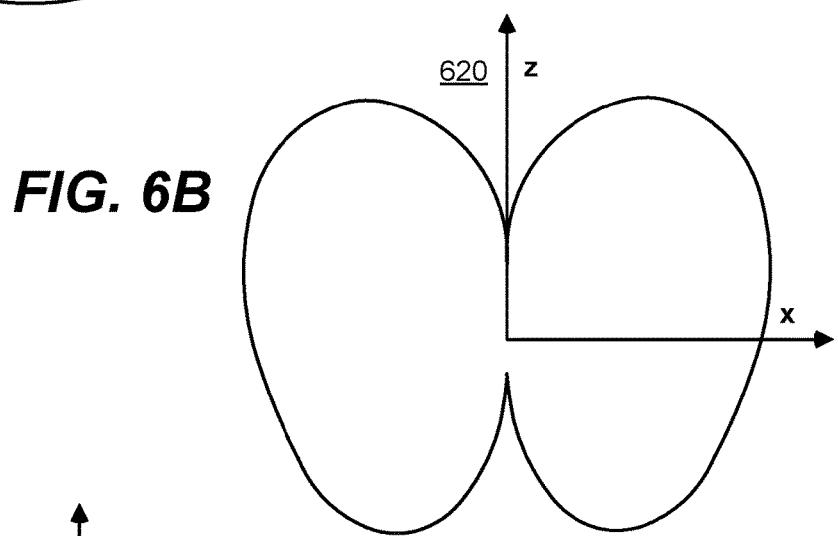
Figure 6C:
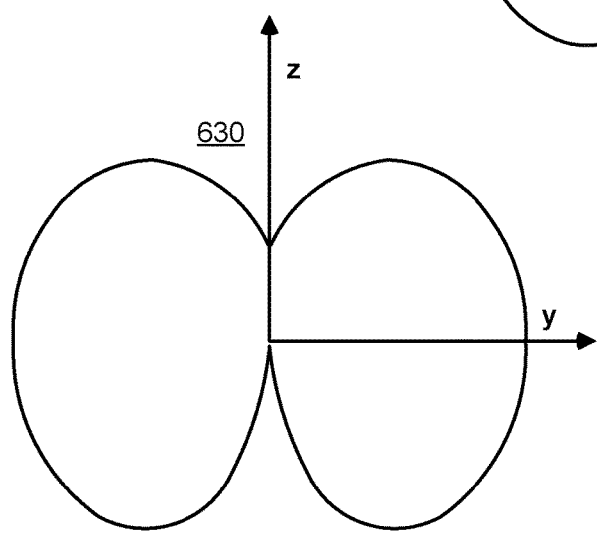

FIGS. 6A-6C illustrate a radiation pattern of a cross loop antenna system, according to an embodiment. Each figure is a plot of the far-field radiation pattern of a cross loop antenna system (e.g., the rear cross loop antenna system 300 or cross loop antenna system 500) in a different coordinate plane. The antenna is centered at the origin of the x-y-z coordinate system. FIGS. 12A, 12B, and 12C illustrate three cross-sections of the radiation pattern: a cross section 610 with the x-y plane, a cross section 620 with the x-z plane, and a cross section 630 with the y-z plane. The radiation pattern is omnidirectional and has nulls (i.e., a direction of no radiated energy) along the vertical axis in both directions. Herein, an omnidirectional radiation pattern refers to a radiation pattern that is approximately the same along the horizontal plane (i.e., the x-y plane) as an ideal omnidirectional radiation pattern. The radiation pattern is "donut shaped," i.e., similar in shape to a torus. In some embodiments, the cross loop antenna may be linearly polarized. In alternate embodiments, the antenna is dual-fed and is circularly polarized.

Figure 7:
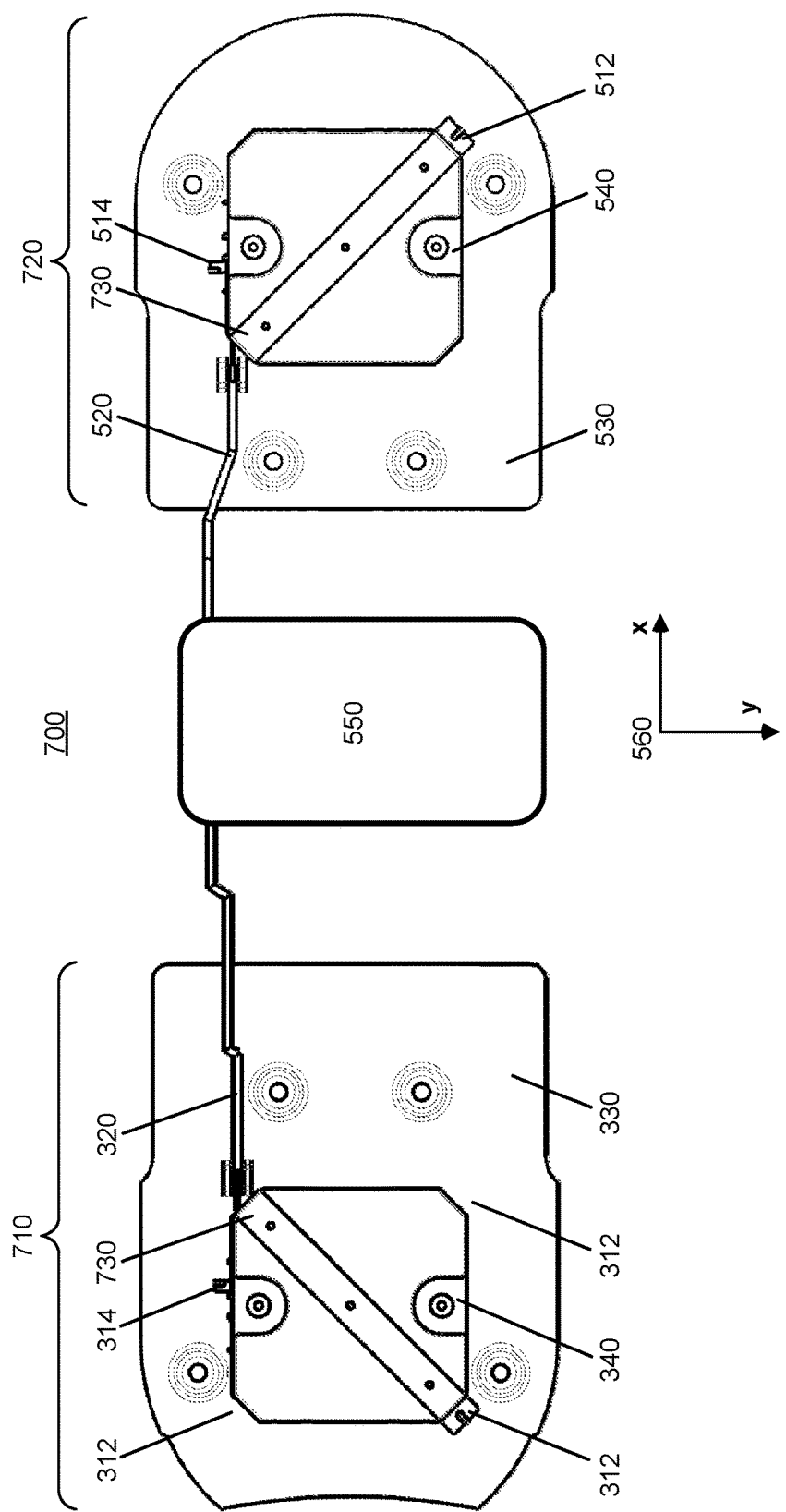
FIG. 7 illustrates rear and front single loop antennas coupled to a wireless communication circuit, according to an embodiment.

FIG. 7 illustrates an example antenna system with rear and front single-loop antennas coupled to a wireless communication circuit, according to an embodiment. The antenna system 700 may include a rear single-loop antenna system 710, a front single-loop antenna system 720, a wireless communication circuit 550, and two feed lines 320, 520. The antenna system 700 illustrated in FIG. 7 may be similar to the antenna system 505 illustrated in FIG. 5, except that the front and rear single-loop antenna systems 720, 710 shown in FIG. 7 include respective single-loop antennas 730 instead of the cross bar antennas 310, 510 of the front and rear cross loop antenna systems 300, 500 shown in FIG. 5.

The single-loop antenna 730 of the rear single-loop antenna system 710 may include a first antenna portion (e.g., a thin bar) with a first end and a second end. A ground contact 312 connects the first end to a ground plane 330 of the rear single-loop antenna system 710 and an impedance-matching ground contact 314 connects the second end of the first antenna portion to the ground plane 330. A feed line 320 connected to the second end of the first antenna portion drives the single-loop antenna 730. The rear single-loop antenna system 710 may have a loop that includes the ground plane 330 and the first antenna portion, the ground contact 312, and the impedance-matching ground contact 314 of the single-loop antenna 730.

Similarly, the single-loop antenna 730 of the front single-loop antenna system 720 may include a second antenna portion (e.g., a thin bar) with a first end and a second end. A ground contact 312 connects the first end to a ground plane 330 of the front single-loop antenna system 720 and an impedance-matching ground contact 314 connects the second end of the second antenna portion to the ground plane 330. A feed line 520 connected to the second end of the second antenna portion drives the single-loop antenna 730. The rear single-loop antenna system 710 may have a loop that includes the ground plane 330 and the second antenna portion, the ground contact 312, and the impedance-matching ground contact 314 of the single-loop antenna 730.

In some example embodiments, the single-loop antennas 730 of the front and rear are substantially perpendicular (i.e., within 10° of being perpendicular). That is, the axes of the single-loop antennas 730 may be substantially perpendicular. In such an example embodiment, the combined radiation patterns of the rear single-loop antenna system 710 and the front single-loop antenna system 720 may be omnidirectional. Because the combined radiation pattern may be omnidirectional, an aerial vehicle (e.g., aerial vehicle 110) that includes the antenna system 700 can maintain communication with a device (e.g., remote controller 120) through at least one of the single-loop antenna systems 710, 720 at any yaw orientation.

Figure 8:
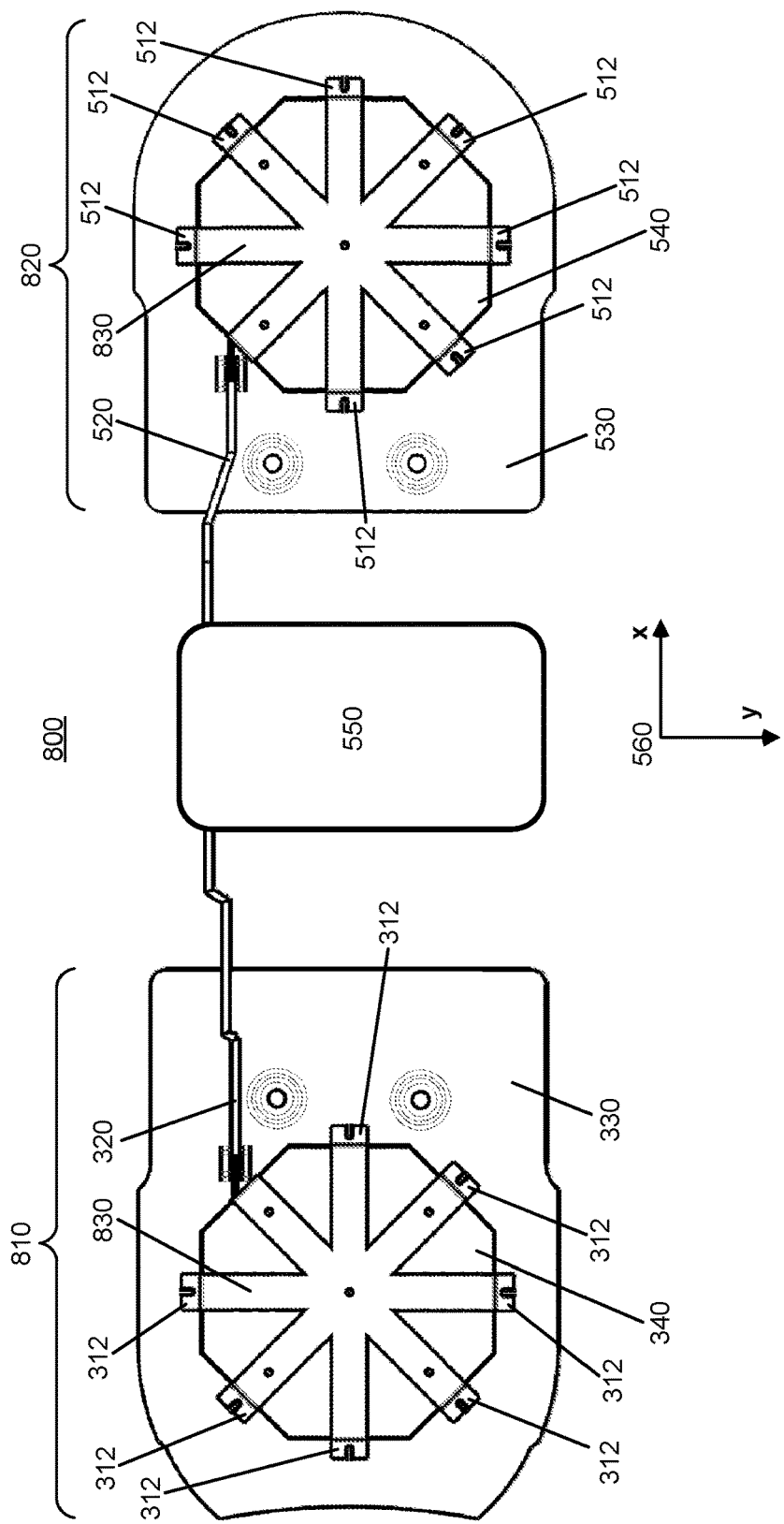
FIG. 8 illustrates rear and front cross loop antennas, each with four antenna loops, in accordance with an embodiment.

FIG. 8 illustrates an antenna system with rear and front cross loop antennas, each with four antenna loops, in accordance with an embodiment. The antenna system 800 may include a rear four-loop antenna system 810, a front four-loop antenna system 820, a wireless communication circuit 550, and two feed lines 320, 520. The antenna system 800 illustrated in FIG. 8 may be similar to the antenna system 505 illustrated in FIG. 5, except that the rear and front four-loop antenna systems 810, 820 shown in FIG. 8 include respective four-loop antennas 830.

Each of the four-loop antennas 830 includes four antenna portions (e.g., thin bars parallel to the x-y plane) with respective first ends and second ends. For three of the four antenna portions, both the first and second end may connect to one of the ground planes 330, 530 at ground contacts 312, 512. The other antenna portion may connect to the ground plane 330, 530 at a first end at a ground contact 312 and connects to one of the feed lines 320, 520 at the second end. The second end of this antenna portion may also connect to the ground plane 330, 530 with an impedance-matching ground contact or an on-board tuning circuit. The antenna portions may all be substantially the same length (i.e., the shortest of the antenna portions may be 85% as long the longest antenna portion or longer).

The loops of the four-loop antennas 830 may be evenly spaced. For example, in FIG. 8, the four loops of the rear four-loop antenna system 810 are each separated by an angle of 45°. The rear and front four-loop antenna systems 810, 820 may each produce omnidirectional radiation patterns. Although FIG. 8 illustrates antennas with four loops, alternate embodiments may include antennas with a different number of loops.

Additional Considerations

The disclosed configuration describes a cross loop antenna system for an aerial vehicle. In one embodiment, the cross loop antenna system includes a cross bar antenna and a ground plane. The cross bar antenna includes two thin coplanar bars that intersect in the middle and are parallel to the ground plane. The two bars may be perpendicular. Each bar connects to the ground plane at each end, comprising an antenna loop. Thus, the cross loop antenna system comprises two intersecting loops, which are single-fed. The feed line connected to one of the antenna loops drives the other antenna loop. The antenna can operate at a wavelength λ that is approximately twice the length of the bars of the cross bar antenna. In such an embodiment, the antenna system may be resonant. The distance between the bars and the ground plane may be relatively small, thus minimizing the vertical profile of the antenna. The antenna may be operated as a dual-band antenna and may produce an omnidirectional radiation pattern. An aerial vehicle may include two such antennas.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for the disclosed crossed loop antenna. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A cross loop antenna system of an unmanned aerial vehicle, the cross loop antenna system comprising:
    a ground plane of the unmanned aerial vehicle;
    a first antenna loop of the unmanned aerial vehicle, the first antenna loop comprising:
        a first antenna portion, the first antenna portion having a first end and a second end, the first end and the second end of the first antenna portion connecting to the ground plane via a ground contact; and
    a second antenna loop, the second antenna loop comprising:
        a second antenna portion, the second antenna portion having a first end and a second end, the first end of the second antenna portion connecting to the ground plane via a ground contact, the second end of the second antenna portion connecting to the ground plane via an impedance-matching ground contact, the second antenna portion intersecting with the first antenna portion.

2. The cross loop antenna system of claim 1, wherein the first antenna portion is substantially perpendicular to the second antenna portion.

3. The cross loop antenna system of claim 1, wherein both the first antenna loop and the second antenna loop are closed loops.

4. The cross loop antenna system of claim 1, wherein the intersection of the first antenna portion and the second antenna portion is substantially centered on the first antenna portion and on the second antenna portion.

5. The cross loop antenna system of claim 1 further comprising:
    a support structure, the support structure inside of both the first antenna loop and the second antenna loop.

6. The cross loop antenna system of claim 5, wherein the support structure is an electrical insulator.

7. The cross loop antenna system of claim 1, wherein a radiation pattern of the cross loop antenna system is omnidirectional.

8. The cross loop antenna system of claim 1, further comprising:
    a feed line, the feed line coupled to the impedance-matching ground contact between the second end of the second antenna portion and the ground plane, a shape of the impedance-matching ground contact configured to match an impedance of the cross loop antenna system with an impedance of the feed line.

9. The cross loop antenna system of claim 1, wherein a first length between the first end and second end of the first antenna portion is substantially the same as a second length between the first end and second end of the second antenna portion.

10. The cross loop antenna system of claim 9, wherein the first length is half of a wavelength of an operating frequency of the cross loop antenna system.

11. The cross loop antenna system of claim 10, wherein the cross loop antenna system is resonant at the wavelength of the operating frequency.

12. The cross loop antenna system of claim 1, wherein the first antenna portion has a thickness, a width, and a length between the first end and the second end of the first antenna portion, the length being greater than the width and the width being greater than the thickness.

13. The cross loop antenna system of claim 1, wherein a length of the first antenna loop is between 70% and 130% of a wavelength of an operating frequency of the cross loop antenna system.

14. The cross loop antenna system of claim 1, wherein the first antenna portion is coplanar with the second antenna portion.

15. The cross loop antenna system of claim 1, wherein both the first antenna portion and the second antenna portion are parallel to the ground plane.

16. The cross loop antenna system of claim 1, wherein the cross loop antenna system is inside of a housing of a remote controlled aerial vehicle.

17. The cross loop antenna system of claim 16, wherein an edge of the ground plane adjoins an interior surface of the housing of the remote controlled aerial vehicle.

\* \* \* \* \*